United States Patent [19]

Lanter et al.

[11] 4,225,621
[45] Sep. 30, 1980

[54] FEED INTAKE LIMITING COMPOSITION FOR CATTLE CONTAINING A SATURATED FATTY ACID

[75] Inventors: Kent J. Lanter, Belleville, Ill.; Norman L. Betz, St. Louis; Danny L. Williams, Manchester, both of Mo.

[73] Assignee: Ralston Purina Company, St. Louis, Mo.

[21] Appl. No.: 849,742

[22] Filed: Nov. 9, 1977

[51] Int. Cl.$^2$ ............................................. A23K 1/00
[52] U.S. Cl. .......................................... 426/2; 426/69; 426/74; 426/601; 426/623; 426/630; 426/646; 426/807
[58] Field of Search ....................... 426/2, 74, 69, 601, 426/611, 606, 629, 623, 636, 646, 630, 634, 656, 807, 648; 424/312, 318

[56] References Cited

U.S. PATENT DOCUMENTS

| | | | |
|---|---|---|---|
| 3,669,676 | 6/1972 | Karr et al. | 426/648 |
| 3,895,117 | 7/1975 | Backlund | 426/807 |
| 4,027,043 | 5/1977 | Schroeder et al. | 426/807 |

OTHER PUBLICATIONS

Mattil et al., "Bailey's Industrial Oil and Fat Products", Interscience Publishers, Third Edition, 1965, pp. 176 & 238-239.

Rose, "The Condensed Chemical Dictionary", Van Nostrand, Reinhold Co., 1970, pp. 241, 420, 545 & 704.

*Primary Examiner*—R. B. Penland
*Attorney, Agent, or Firm*—Virgil B. Hill

[57] ABSTRACT

A composition for limiting feed supplement intake for cattle is disclosed which comprises at least one member of a group of compounds, including mixtures of these compounds, having the formula:

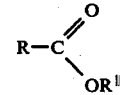

in which R is a $C_9$ to $C_{17}$ saturated aliphatic group and $R^1$ is hydrogen or a lower alkyl such a methyl, ethyl, propyl, or a cation such as sodium or potassium together with meat meal, diammonium phosphate, and ammonium sulfate. Furthermore, a compound of the above general type, has been found to control feed supplement intake in cattle without the additional intake limiting ingredients. These compositions control feed supplement intake by cattle upon addition to the feed supplement, thereby permitting self-rationed feeding to the cattle without waste, yet providing the right degree of weight maintenance for the animal.

19 Claims, No Drawings

FEED INTAKE LIMITING COMPOSITION FOR CATTLE CONTAINING A SATURATED FATTY ACID

BACKGROUND OF THE INVENTION

This invention relates to a feed intake limiting composition for cattle and a process for employing the same in order to attain an economical and efficient means of self-feeding cattle.

In the feeding of animals on pasture, particularly cattle, it is often very advantageous from the standpoint of economics, as well as convenience, for the cattle to be self-fed which means that the cattle are offered a feed supplement on a free choice basis without periodic feedings of a rationed amount by a farmer or rancher each day. A disadvantage, however, of self-feeding animals such as cattle is that the animals tend to over-eat feed supplements and consequently get a higher intake of supplement than is completely necessary for proper weight gain or weight maintenance. This results in an additional expense to the rancher in having to provide unnecessary amounts of protein or feed supplement to be fed in combination with a roughage source such as grass or hay.

It is, therefore, desirable to limit the intake of the protein or feed supplement to an amount which is needed for weight gain or weight maintenance without consumption of more than is needed by the animal. The prior art has also incorporated salt or gypsum in the feed supplement in order to control consumption of the supplement to a prescribed amount. A disadvantage, however, in employing either one of these compounds to control consumption and provide an effective self-feeding composition is that both materials provide little nutritional value and require mixing in large quantities with the supplement in order to reduce consumption. For example, one part of salt to three parts of protein or feed supplement will ordinarily be required to reduce daily consumption in cattle to the desired amount. Another disadvantage of employing these materials is that salt poisoning of the animals may occur if water is not freely available.

U.S. Pat. No. 3,669,676 provides a solution to the above disadvantages by describing a feed intake limiting composition for cattle comprising a mixture of fish oil, ammonium sulfate, diammonium phosphate, and meat meal. This mixture can be added to a feed supplement which can then be offered on a free choice basis to cattle in combination with a roughage source such as grass or hay. The combination of these materials contribute to the nutrient requirements for the feed supplement as well as effectively control intake of the supplement to a prescribed amount. While this composition has proven to be extremely desirable and effective as an intake limiter, the availability of certain components of the mixture, as well as a continuing need for other limiters which effectively control intake and contribute to the nutritive properties of the feed supplement has necessitated the development of the feed intake limiting composition of the present invention.

SUMMARY OF THE INVENTION

The feed intake limiting composition of the present invention comprises at least one member of a group of compounds, including mixtures of these compounds, having the following structural formula:

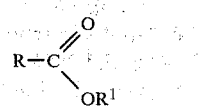

in which R is a $C_9$ to $C_{17}$ saturated aliphatic group and $R^1$ is hydrogen or a lower alkyl such as methyl, ethyl, propyl, or a sodium or potassium cation, together with a material selected from the group consisting of meat meal, diammonium phosphate, ammonium sulfate, and combinations thereof.

A unique feature of the present invention is that if a compound is employed of the above general structural formula, the resultant material will effectively control or limit intake of the feed supplement without the use of either the meat meal, diammonium phosphate and ammonium sulfate mentioned above, provided the compound is used in the feed supplement at a level effective to limit intake of the feed supplement and preferably at a level exceeding 4% by weight. A preferred material which functions in this manner, is one in which R is a $C_{11}$ saturated aliphatic hydrocarbon, and $R^1$ is a hydrogen, this material being commonly referred to as lauric acid.

The above materials are not only effective in limiting intake, they also do not detract from or destroy the nutritional balance of the feed supplement. The noted composition does not require feeding in a large quantity and provides a convenient and economical means of limiting the feed supplement intake in cattle when incorporated into the feed supplement.

An object, therefore of the present invention is to provide for a composition which consists of components which individually do not detract from the nutrient requirements of the feed supplement, while at the same time effectively limit feed supplement intake to a predetermined amount in order to allow self-feeding of the cattle.

It is also an object of the present invention to provide a method for limiting feed supplement intake by cattle by feeding a composition comprising various materials which individually add to the nutrient requirements of the animal, yet effectively limit supplement intake when combined with a roughage source to provide a convenient and economical means of feeding cattle.

DESCRIPTION OF THE PREFERRED EMBODIMENTS

In accordance with the present invention a composition has been developed which is capable of limiting feed supplement consumption or intake to a predetermined amount that is necessary for proper weight maintenance of cattle. The predetermined amount of feed supplement intake for cattle will accordingly vary depending on the type of animals as well as the environmental conditions under which they are maintained and is, therefore, not intended to limit the present invention although it may be generally considered that a preferred feed intake limitation for a feed supplement will be less than about 4 lbs. of supplement per head of cattle per day and most preferably will vary between about 2 to 4 lbs. of supplement per head of cattle per day. This amount will generally be the amount of intake which is necessary for proper weight maintenance as well as the most efficient feed utilization by the animal.

The feed intake limiting composition of the present invention comprises at least one member of a group of compounds, including mixtures of these compounds, having the following structural formula:

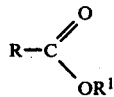

in which R is a $C_9$ to $C_{17}$ saturated aliphatic group, and $R^1$ is a hydrogen or lower alkyl such as methyl, ethyl, propyl, or cation such as sodium or potassium together with meat meal, diammonium phosphate, ammonium sulfate, or combinations thereof.

As previously noted, the feed intake limiting composition of the present invention can also comprise a single material having the above structural formula. A preferred material which can be employed by itself as an intaker limiter is one in which R is a $C_{11}$ saturated aliphatic group and $R^1$ is a hydrogen, the resultant material commonly being referred to as lauric acid. This material will effectively control or limit intake of the feed supplement without the use of the additional ingredients such as meat meal, diammonium phosphate and ammonium sulfate provided the lauric acid is also used in the feed supplement at a level effective to limit intake preferably exceeding 4% by weight. It is, however, preferred that a compound of the above type be used in combination with the other ingredients such as a material selected from the group consisting of the meat meal, diammonium phosphate, ammonium sulfate, and combinations or mixtures of these materials since these materials also impart desirable nutritive properties to the feed supplement as well as provide the most consistent degree of feed intake limitation under widely varying environmental conditions.

Therefore, in the preferred embodiment of the present invention the feed intake limiting composition may contain sufficient ammonium sulfate so that the feed supplement to which the intake limiting composition is added will contain between about 0.1-5% by weight of ammonium sulfate, although preferably the amount of ammonium sulfate may be varied between 1 and 4% to achieve a preferred level of intake limitation when used in combination with the preferred amounts of the other ingredients of the intake limiting composition. The type of ammonium sulfate which may be employed in the present invention is not critical to its practice and may be generally of any type considered suitable for feed use and being of sufficient purity to not have any harmful effect on the animal.

In the preferred embodiment of the present invention, the feed intake limiting composition may also contain sufficient diammonium phosphate so that the feed supplement to which the composition is added will contain between about 0.1-5% by weight of diammonium phosphate. The preferred amount of diammonium phosphate which may be added is between about 2 and 5% by weight in order to achieve the preferred level of intake limitation when used in combination with preferred amounts of other ingredients of the intake limiting composition. Likewise, the present invention is not limited by the type or purity of diammonium phosphate which may be employed and any source of this material normally considered suitable for feed use may be employed in the present invention.

Also, in the preferred embodiment described above, the intake limiting composition of the present invention may also contain as an ingredient, meat meal or an equivalent dry or ground meat scraps of meat by-products in such an amount that the feed supplement to which this composition is added will contain between about 0.1-20% by weight of meat meal. Preferably the amount of meat meal may be varied between 3 and 17% by weight of the feed supplement to also achieve the preferred level of intake limitation when used in combination with preferred amounts of other ingredients of the intake limiting composition.

The feed intake limiting composition which employs a combination of meat meal, diammonium phosphate, and ammonium sulfate will also include as an essential ingredient at least one member of a group of compounds, including mixtures of these compounds, having the following structural formula:

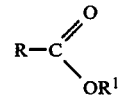

in which R is a $C_9$ to $C_{17}$ saturated aliphatic group, and $R^1$ is hydrogen or a lower alkyl such as methyl, ethyl, propyl, or a cation such as sodium or potassium.

Preferred materials which are within the above general group of compounds suitable for use in the intake limiting composition of the present invention, include those saturated aliphatic fatty acids having a carbon length between $C_{10}$ and $C_{18}$. Other materials which are suitable include the lower aliphatic ($C_1$–$C_3$) esters of the above fatty acids as well as the sodium and potassium salts thereof. A specifically preferred material for the purposes of the present invention and which can be the most conveniently employed for intake limitation purposes is lauric acid. This fatty acid, as well as other materials of the above general structural formula when used with other limiters should be employed in the intake limiting composition of the present invention at a level sufficient to limit intake. Preferably this will be at a level in combination with other limiters, so that the feed supplement to which the composition is added, will contain at least about 1% by weight of the material. Typical amounts of these materials are between about 2 and 16% by weight of the feed supplement. The purity iof the above materials which may be employed in the intake limiting composition of the present invention may be generally of any type and in fact, a convenient and desirable means of obtaining suitable levels of the above materials is to employ certain vegetable fats or oils containing a very high percentage of $C_{10}$–$C_{18}$ saturated fatty acids, particularly the $C_{10}$–$C_{14}$ saturated fatty acids. Vegetable oils or fats which are especially suitable include coconut oil, babassu oil, and palm kernel oil. These three generally have the following typical composition and it is apparent all of these oils will be quite high in the desired compounds of the above generally type, specifically lauric ($C_{12}$) and myristic ($C_{14}$) acids.

TABLE I
MAJOR SATURATED FATTY ACID COMPOSITION OF TYPICAL VEGETABLE FATS AND OILS

| Fat | Typical Percentage by Weight of Major Saturated Fatty Acids | | | | | | | |
|---|---|---|---|---|---|---|---|---|
| | Hexanoic ($C_6$) | Octanoic ($C_8$) | Decanoic ($C_{10}$) | Lauric ($C_{12}$) | Myristic ($C_{14}$) | Palmitic ($C_{16}$) | Stearic ($C_{18}$) | Arachidic ($C_{20}$) |
| Coconut Oil | 0.5 | 8.0 | 6.4 | 48.5 | 17.6 | 8.4 | 2.5 | 0.1 |
| Babassu Oil | 0.4 | 5.3 | 5.9 | 44.2 | 15.8 | 8.6 | 2.9 | 0.1 |
| Palm Kernel Oil | 0.3 | 3.9 | 4.0 | 49.6 | 16.0 | 8.0 | 2.4 | 0.1 |
| Tucum Oil | 0.2 | 2.9 | 2.3 | 51.8 | 22.0 | 6.8 | 2.3 | — |
| Muru Muru Tallow | 0.1 | 1.3 | 1.5 | 46.2 | 32.4 | 5.6 | 2.2 | 0.2 |

The appropriate oil or fat is used in such an amount that the required minimum level of individual fatty acid or acids is met for intake limitation purposes, this minimum level of acid preferably comprising at least 1% by weight if used with other intake limiters or at least 4% by weight if used as the sole intake limiter. For example, if 4% lauric acid is determined to be the desired amount in the feed supplement either with or without the other intake limiting ingredients, then if one of the above oils or fats is employed at approximately 8% by weight this insures a minimum of at least 4.0% by weight of lauric acid.

The preferred composition for intake limitation in the present invention comprises a mixture of a material selected from the group consisting of ammonium sulfate, diammonium phosphate, meat meal and combinations of these materials together with a saturated aliphatic fatty acid compound. These materials may be combined and added as a mixture to a feed supplement or the components of the noted composition may be mixed individually with the feed supplement in predetermined amounts. Furthermore, the feed supplement to which the intake limiting composition of the present invention may be added, can be any feed material which is generally intended to provide the full nutritional requirements of the animal, with the exception of, as in the case of cattle, the various roughage sources which are considered to be necessary for proper nutrition. Therefore, the feed supplement to which the intake limiting compositions of the present invention may be added, may consist of various grains which are predominantly farinaceous or proteinaceous as the case may be. Included among these suitable proteinaceous materials are the vegetable proteins such as soybeans, cottonseed, or peanuts. These are considered to be highly utilizable and available sources of protein for animals. Likewise, various farinaceous materials which contain a lower percentage of protein, but additionally contribute to the protein requirement of the feed supplement, may also be employed among which are grains such as corn, milo, alfalfa or various wheat materials or wheat by-products. If desired, the feed supplement may additionally contain various non-protein nitrogen materials such as urea or biuret or other sources of non-protein nitrogen which ruminant animals specifically utilize and convert to organic protein. This provides a cheap and effective source of nitrogen in a ruminant diet. The feed supplement will also typically contain various minerals considered essential for animals such as cattle as well as various vitamins either fat or water soluble, which typically are added to feed supplements for complete nutritional balance.

A further ingredient which may be employed in the present invention if desired, are various medicaments or additives to the feed supplement either for the purpose of disease control or for improving performance. Materials of this type include additives such as antibiotics, bacteriostats, hormones, and the like.

For the most effective results, a feed supplement will be fed to the cattle in combination with various cellulosic roughage sources such as grass, hays, or silage and the present invention is not intended to be limited insofar as any specific roughage sources to be used in combination with the feed supplement containing the intake limiting composition. It should be recognized that the particular roughage source which may be utilized in the present invention will be generally dictated by local availability of various forage crops.

The protein or feed supplement containing the intake limiting composition of the present invention may be fed in any manner or form considered to be suitable for feeding animals such as cattle. For example, the feed supplement containing the intake limiting composition may be formed into pellets or cubes and fed in this form or may be compressed into large blocks and offered to cattle grazing on a pasture or a range. It is preferred, however, to feed or administer the feed supplement containing the intake limiting composition in meal or mash form in such a manner that the cattle have free and ready access to it. It is believed, although this is not intended to be a controlling or limiting factor in the present invention, that the intake limiting properties of the present composition is more effective when fed in a meal form as opposed to a pellet or cube form.

For purposes of a full and complete disclosure of the present invention, the following Examples are set forth as illustrative rather than limiting embodiments thereof.

EXAMPLE 1

To evaluate the effectiveness of the intake limiting compositions of the present invention, a total of 9 cows were offered the following feed supplement containing 4% by weight of lauric acid with a native grass hay on a free choice basis for a period of 5 days and consumption of the ration measured. The formula of the feed supplement was as follows:

| Ingredient | Percent by Weight |
|---|---|
| Cracker Milo | 56.63 |
| Dehydrated Alfalfa | 5.43 |
| Wheat Midds | 10.00 |
| Dicalcium Phosphate | 2.40 |
| Salt | 5.00 |
| Soybean Meal (44% Protein) | 13.59 |
| Urea | 2.80 |
| Lauric Acid | 4.00 |
| Vitamins, Minerals and Antioxidant | 0.15 |

Consumption of the above identified feed supplement was measured and determined to be 3.8 lbs. of supplement per head of cattle per day.

EXAMPLE 2

The following identified feed supplement containing 8% by weight of coconut oil was evaluated for intake limiting properties by feeding it with a native grass hay to a total of 9 cows for a period of 5 days and measuring the consumption. The formula of the feed supplement was as follows:

| Ingredient | Percent by Weight |
| --- | --- |
| Cracked Milo | 52.63 |
| Dehydrated Alfalfa | 5.43 |
| Wheat Midds | 10.00 |
| Dicalcium Phosphate | 2.40 |
| Salt | 5.00 |
| Soybean Meal (44% Protein) | 13.59 |
| Urea | 2.80 |
| Coconut Oil | 8.00 |
| Vitamins, Minerals and Antioxidant | 0.15 |

Consumption of the above identified feed supplement was measured and determined to be 3.7 lbs. of supplement per head of cattle per day.

EXAMPLE 3

To evaluate the effectiveness of an intake limiting composition of the present invention in limiting the intake of cattle, a total of 6 cows were offered a feed supplement containing, as an intake limiting composition, a mixture of 1% by weight of lauric acid, 12% by weight of meat meal, 2% by weight of ammonium sulfate, and 2.4% by weight of diammonium phosphate. The cows were offered the feed supplement containing the intake limiting composition with a native grass hay on a free choice basis for a period of 5 days and consumption of the ration was measured. The formula of the feed supplement was as follows:

| Ingredient | Percent by Weight |
| --- | --- |
| Cracked Milo | 59.05 |
| Dehydrated Alfalfa | 5.00 |
| Wheat Midds | 10.00 |
| Meat Meal | 12.00 |
| Ammonium Sulfate | 2.00 |
| Dicalcium Phosphate | 2.40 |
| Salt | 5.00 |
| Diammonium Phosphate | 2.40 |
| Lauric Acid | 1.00 |
| Urea | 1.00 |
| Vitamins, Minerals and Antioxidant | 0.15 |

Consumption of the above identified feed supplement was measured and determined to be 4.5 lbs. of supplement per head of cattle per day.

EXAMPLE 4

A feed supplement which was identical in every respect to that listed in Example 3 with the exception that the amount of lauric acid that was employed was 2.0% by weight and the level of Cracked Milo that was employed was 58.05% by weight. This supplement was evaluated for feed intake on a total of 9 cows who were offered the feed supplement with a native grass hay on a free choice basis for a period of 5 days. Consumption of the supplement was determined to be equal to 2.6 lbs. of supplement per head of cattle per day.

EXAMPLE 5

A feed supplement was prepared which was identical to that used in Example 3 with the exception that the level of lauric acid was 4.0% by weight and the level of Cracked Milo was 56.05% by weight. This feed supplement containing the noted intake limiting composition was fed with a native grass hay to a total of 9 cows for a period of 5 days and consumption of the feed measured. Consumption of the above identified feed supplement was determined to be 3.0 lbs. of supplement per head of cattle per day.

EXAMPLE 6

A feed supplement was prepared which was identical to that of Example 5 with the exception that 4.0% by weight of Myristic Acid ($C_{14}$ Acid) was used to replace the 4% by weight of Lauric Acid in Example 5. The feed supplement containing the Myristic Acid was fed with a native grass hay to a total of 6 cows for a period of 5 days on a free choice basis and consumption of ration by the cows was determined to be 3.9 lbs. of supplement per head of cattle per day.

EXAMPLE 7

A feed supplement was prepared which was identical to that of Example 5 except that 4% by weight of Decanoic Acid ($C_{10}$ Acid) was substituted for the Lauric Acid. The feed supplement which included the Decanoic Acid was fed with a native grass hay to a total of 6 cows for a period of 5 days on a free choice basis and consumption of the ration was determined to be 3.4 lbs. of supplement per head of cattle per day.

EXAMPLE 8

A feed supplement was prepared which was identical in every respect to that of Example 5 with the exception that 4.0% by weight of Stearic Acid ($C_{18}$) was substituted for the 4% Lauric Acid employed in Example 5. The feed supplement containing the intake limiting composition which also included Stearic Acid was fed with a native grass hay to a total of 9 cows for a period of 4 days on a free choice basis. Consumption of the ration was determined to be equal to 4.7 lbs. of supplement per head of cattle per day.

EXAMPLE 9

A feed supplement which was identical in every respect to that of Example 5 was prepared with exception that 4% by weight of methyl laurate was substituted for the Lauric Acid employed in Example 5. The feed supplement containing the intake limiting composition, which also included methyl laurate was fed with a native grass hay to the total of 9 cows for a period of 5 days on a free choice basis and consumption of the ration was determined to be equivalent to 2.2 lbs. of supplement per head of cattle per day.

EXAMPLE 10

The following feed supplement was prepared, wherein the feed intake limiting composition comprised 8% by weight of Palm Kernel oil, 12% by weight of meat meal, 2% by weight of ammonium sulfate, and 2.4% by weight of diammonium phosphate. The feed supplement with the intake limiter was fed with a native grass hay to a total of 5 cows for a period of 5 days on a free choice basis and consumption of the feed measured. The formula of the feed supplement is as follows:

| Ingredient | Percent by Weight |
|---|---|
| Cracked Milo | 52.05 |
| Dehydrated Alfalfa | 5.00 |
| Wheat Midds | 10.00 |
| Meat Meal | 12.00 |
| Ammonium Sulfate | 2.00 |
| Dicalcium Phosphate | 2.40 |
| Salt | 5.00 |
| Diammonium Phosphate | 2.40 |
| Urea | 1.00 |
| Palm Kernel Oil | 8.00 |
| Vitamins, Minerals and Antioxidant | 0.15 |

Consumption of the above identified supplement was measured and determined to be 1.1 lbs. of supplement per head of cattle per day.

EXAMPLE 11

A feed supplement was prepared which was identical in every respect to that in Example 10 with the exception that 8% by weight of Babassu oil was substituted for the Palm Kernel oil. This feed supplement was fed with a native grass hay to a total of 5 cows for a period of 5 days on a free choice basis and consumption of the feed was determined to be 1.4 lbs. of the supplement per head of cattle per day.

EXAMPLE 12

A feed supplement was prepared which was identical in every respect to that in Example 10 with the exception that 8% by weight of palmitic acid ($C_{16}$) was substituted for the palm kernel oil. This supplement was fed with a native grass hay to a total of 9 cows for a period of 5 days on a free choice basis and consumption of the feed was determined to be 2.8 lbs. of supplement per head of cattle per day.

It may be seen from the above identified Examples that the intake limiting compositions of the present invention effectively reduce consumption of the feed supplement to the desired amount enabling cattle to be self-fed for a specific period while adequately maintaining their weight.

The above Examples are merely illustrative of the instant invention and it will be understood that various other changes in the details, materials, or steps which have been described may be made without departing from the spirit of the instant disclosure, and such changes and other modifications are intended to be included within the scope of the instant disclosure and appended claims.

We claim:

1. A feed intake limiting composition for cattle to control consumption of a feed supplement when added thereto comprising at least one member of a group of compounds, including mixtures of these compounds, at a level in said supplement, of at least about 1% by weight having the formula:

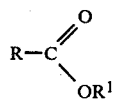

wherein R is a $C_9$ to a $C_{13}$ saturated aliphatic, $R^1$ is selected from the group consisting of a hydrogen, a $C_1$ to $C_3$ alkyl, potassium and sodium together with a material selected from the group consisting of meat meal, ammonium sulfate, diammonium phosphate, and combinations thereof.

2. The composition of claim 1 wherein the level of meat meal is about 0.1 to 20% by weight of said supplement.

3. The composition of claim 1 wherein the level of ammonium sulfate is about 0.1 to 5% by weight of said supplement.

4. The composition of claim 1 wherein the level of diammonium phosphate is about 0.1 to 5% by weight of said supplement.

5. The composition of claim 1 wherein said level is between about 2–16% by weight of said supplement.

6. A feed intake limiting composition for cattle to control consumption of a feed supplement when added thereto consisting essentially of; an oil selected from the group consisting of coconut oil, palm kernel oil, babassu oil, and mixtures thereof at a level in said supplement of at least about 4% by weight together with a material selected from the group consisting of meat meal, ammonium sulfate, diammonium phosphate, and combinations thereof wherein said oil is the sole oil present in said feed supplement.

7. The composition of claim 6 wherein the level of meat meal is about 0.1 to 20% by weight of said supplement.

8. The composition of claim 6 wherein the level of ammonium sulfate is about 0.1 to 5% by weight of said supplement.

9. The composition of claim 6 wherein the level of diammonium phosphate is about 0.1 to 5% by weight of said supplement.

10. A feed supplement for cattle containing an intake limiting composition, said feed supplement comprising grain, said intake limiting composition comprising at least one member of a group of compounds, including mixtures of these compounds, at a level of at least about 4% by weight of said supplement, having the formula:

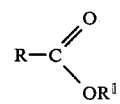

wherein R is a $C_9$ to a $C_{13}$ saturated aliphatic, $R^1$ is selected from the group consisting of hydrogen, a $C_1$ to $C_3$ alkyl potassium and sodium.

11. The feed supplement of claim 10 wherein the intake limiting composition comprises lauric acid.

12. A feed supplement for cattle containing an intake limiting composition, said feed supplement consisting essentially of grain, said intake limiting composition comprising at least about 8% by weight of said supplement, of an oil selected from the group consisting of coconut oil, babassu oil, palm kernel oil, and mixtures thereof wherin said oil is the sole oil present in said feed supplement.

13. The feed supplement of claim 12 which includes intake limiting amounts of a material selected from the group consisting of meat meal, diammonium phosphate, ammonium sulfate, and mixtures thereof.

14. A method of self-feeding cattle by limiting feed supplement intake to a predetermined amount which comprises feeding at a level of at least about 4% by weight of said supplement at least one member of a group of compounds, including mixtures of these compounds, having the formula:

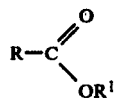

wherein R is a $C_9$ to a $C_{13}$ saturated aliphatic, $R^1$ is selected from the group consisting of hydrogen, a $C_1$ to $C_3$ alkyl potassium and sodium.

15. The method of claim 14 wherein the intake limiting composition comprises lauric acid.

16. A method of self-feeding cattle by limiting feed supplement intake to a predetermined amount which comprises feeding in said supplement in an amount of at least about 8% by weight an intake limiting composition containing essentially of an oil selected from the group consisting of coconut oil, babassu oil, palm kernel oil, and mixtures thereof wherein said oil is the sole oil present in said feed supplement.

17. The method of self-feeding cattle by limiting feed supplement intake to a predetermined amount which comprises administering in said supplement, an intake limiting composition comprising at least one member of a group of compounds, including mixtures of these compounds, at a level in said supplement of at least about 1% by weight having a formula:

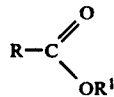

wherein R is a $C_9$ to a $C_{13}$ saturated aliphatic, $R^1$ is selected from the group consisting of hydrogen, a $C_1$ to $C_3$ alkyl potassium and sodium, together with a material selected from the group consisting of meat meal, ammonium sulfate, diammonium phosphate, and combinations thereof.

18. The method of claim 17 wherein the level of meat meal is 0.1 to 20% by weight of said supplement, the level of ammonium sulfate is 0.1 to 5% by weight of said supplement, and the level of diammonium phosphate is 0.1 to 5% by weight of said supplement.

19. The method of claim 17 wherein the level effective to limit intake is between about 2 and 16% by weight of said supplement.

* * * * *